(12) United States Patent
Johansson et al.

(10) Patent No.: US 7,264,110 B2
(45) Date of Patent: Sep. 4, 2007

(54) FEEDING DEVICE

(75) Inventors: Mats Johansson, Eslov (SE); Peter Gustavsson, Kristianstad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 158 days.

(21) Appl. No.: 10/533,294

(22) PCT Filed: Nov. 26, 2003

(86) PCT No.: PCT/SE03/01827

§ 371 (c)(1),
(2), (4) Date: Apr. 29, 2005

(87) PCT Pub. No.: WO2004/054905

PCT Pub. Date: Jul. 1, 2004

(65) Prior Publication Data

US 2006/0049022 A1  Mar. 9, 2006

(30) Foreign Application Priority Data

Dec. 13, 2002 (SE) ................................ 0203691

(51) Int. Cl.
*B65G 37/00* (2006.01)
(52) U.S. Cl. .................. 198/480.1; 198/479.1
(58) Field of Classification Search ............ 198/459.2, 198/478.1, 479.1, 480.1, 481.1
See application file for complete search history.

(56) References Cited

U.S. PATENT DOCUMENTS

| | | | | |
|---|---|---|---|---|
| 1,212,754 A | * | 1/1917 | Fleischer ................ | 198/480.1 |
| 1,503,521 A | * | 8/1924 | Strandt .................... | 198/459.2 |
| 1,893,746 A | * | 1/1933 | Kantor .................... | 198/480.1 |
| 4,619,357 A | * | 10/1986 | Radzins et al. .......... | 198/479.1 |
| 4,843,797 A | | 7/1989 | Butterly, Jr. et al. | |
| 5,310,041 A | * | 5/1994 | Draghetti ................ | 198/480.1 |
| 5,697,489 A | * | 12/1997 | Deonarine et al. ....... | 198/480.1 |

FOREIGN PATENT DOCUMENTS

| | | |
|---|---|---|
| DE | 101 23 081 C1 | 11/2002 |
| EP | 0 887 261 A1 | 12/1998 |
| EP | 1 247 769 A1 | 10/2002 |
| GB | 711 056 A | 6/1954 |
| WO | 02/28716 A2 | 4/2002 |

* cited by examiner

*Primary Examiner*—James R. Bidwell
(74) *Attorney, Agent, or Firm*—Buchanan, Ingersoll & Rooney PC

(57) ABSTRACT

A device for feeding packages from a packaging machine has first, second, third and fourth package drivers. The drivers are arranged to transport packages in a transportation direction from an infeed station to an outfeed station. The drivers are arranged diametrically in relation to each other in pairs and rotatably about a common centre axis. A method of feeding packages from a packaging machine includes receiving at the infeed station packages between the first and second drivers, transporting the packages by rotation of the drivers to the outfeed station, and when the packages have reached the outfeed station, returning the first driver to the infeed station and advancing the second driver so that the fourth driver advances to the infeed station, the first and fourth drivers being ready to receive subsequent packages.

19 Claims, 2 Drawing Sheets

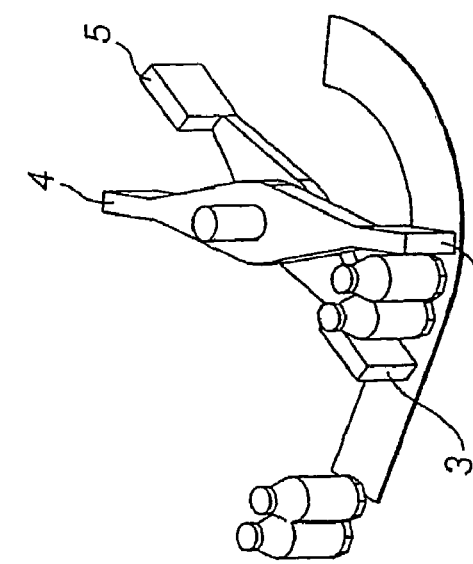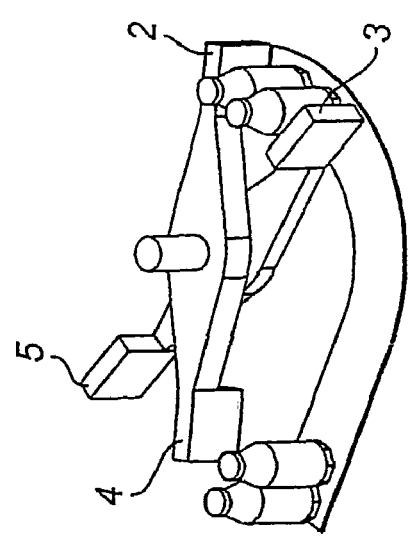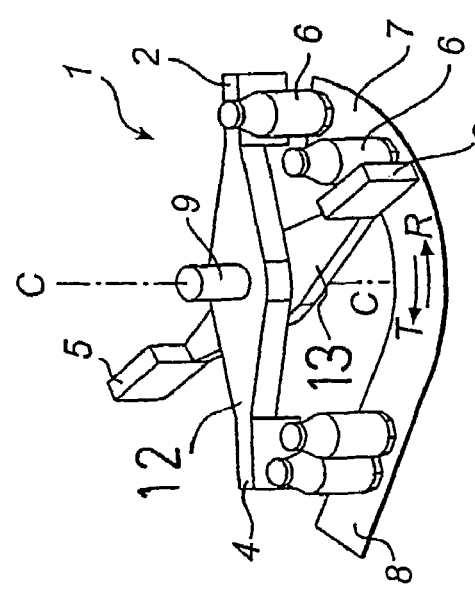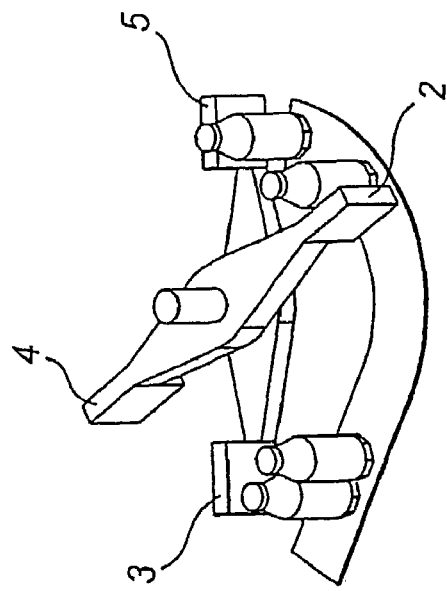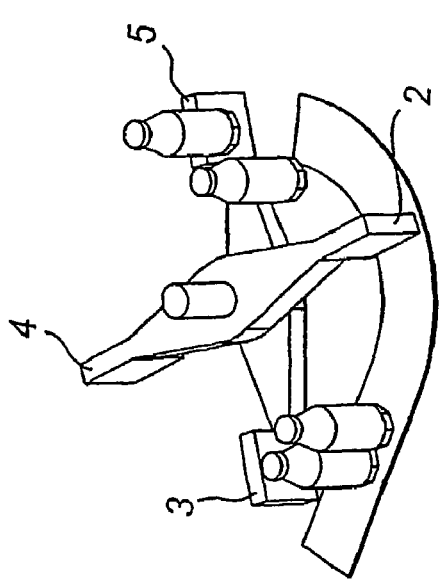

FEEDING DEVICE

FIELD OF THE INVENTION

The present invention relates to a device for feeding packages from a packaging machine. The invention further relates to a method of feeding packages from a packaging machine.

BACKGROUND ART

Devices of the above-mentioned kind are used e.g. for changing the direction of packages leaving the packaging machine before they are treated further. Such devices may also be used for packing together packages leaving the packaging machine with a distance between them, so that they have no or only a small distance between them when transported on for further treatment. If the packages are not packed together, there is a risk of them "climbing" on each other and tipping over.

An example of a device of the aforementioned kind can be seen in WO 02/28716, wherein the orientation of transported packages is turned so that packages received by the device travelling with a short side first in the transportation direction are turned to travel with a long side first. The device comprises a rotating wheel and carrier assemblies pivotally attached to the rotating wheel. This device is used for changing the orientation of the packages and does not pack them together. Further, the transportation direction is not changed.

Devices for feeding packages from a packaging machine may also comprise an endless rotatable chain with rectangular blades projecting from the chain. In EP-A-887 261 a chain of this type is used for transporting packages within a folding unit of a packaging machine. When this chain is used for feeding packages from the packaging machine, a package held between two blades is pushed out from the chain at an output station as the rotating chain deflects downwards. The package standing on one end during transportation on the chain lands on its opposite end when fed out by the chain and blades. This device is used for transporting the packages during folding of the flaps in the bottom of the package to their final position. However, it does not pack the packages together.

SUMMARY OF THE INVENTION

The object of the present invention is to solve or at least partly alleviate the problems mentioned above.

A specific object is to provide a device for feeding packages from a packaging machine which makes it possible to quickly and securely feed the packages.

Another object is to provide a device which may quickly and accurately pack together packages leaving the packaging machine at a distance from each other.

Yet another object of the invention is to provide a method of feeding packages from a packaging machine which is quick and secure.

An object of the invention is also to provide a method by which packages may be simply and quickly packed together after leaving the packaging machine.

The inventive device has four drivers for transporting packages in a transportation direction from an infeed station to an outfeed station, said drivers being arranged in pairs, each pair being arranged diametrically about a common centre axis. This device makes it possible to quickly and securely feed packages from a packaging machine.

In one embodiment, one driver in one pair is arranged to engage the packages from behind and one driver in the other pair is arranged to engage the packages from the front in the transportation direction. Thus, the packages may be securely held between two drivers during transportation.

The drivers are preferably arranged to rotate alternately in a first and second direction about the centre axis, the transportation direction being in the first direction. This makes it easy to quickly prepare the device for transportation of subsequent packages after transportation of a first set of packages from the infeed station to the outfeed station.

In one embodiment of the invention, the pair comprising the first and third drivers and the pair comprising the second and fourth drivers, respectively, after each transportation of packages to the outfeed station are arranged to rotate in opposite directions. This makes it possible to speed up the preparation of the device for transportation of subsequent packages.

The first and third drivers are preferably arranged to rotate in the first direction after every second transportation of packages to the outfeed station and to rotate in the second direction after every second transportation of packages to the outfeed station. This further speeds up the preparation of the device.

In one embodiment, the driver which engages the packages from behind is arranged to, after transportation of the packages to the outfeed station, rotate in the second direction to enable engagement with subsequent packages at the infeed station from the front, and the driver which engages the packages from the front, after transportation of the packages to the outfeed station is arranged to rotate in the first direction to enable engagement of the other driver in the same pair with the subsequent packages at the infeed station from behind. This alternating arrangement is a simple and reliable way of making the device ready for subsequent transportations.

The drivers may be arranged to transfer the packages to a conveyor belt at the outfeed station, the conveyor belt moving at a conveyor belt speed. The drivers are preferably arranged to deliver the packages at a speed essentially equal to the conveyor belt speed. Thus, no significant acceleration of the packages is needed when they reach the conveyor belt and therefore the risk of the packages tipping over is reduced.

The device may comprise means for moving and turning packages leaving the packaging machine upside down, placing the packages turned the right way round at the infeed station of the device. Thus, packages filled in the packaging machine via the bottom end may be taken from the packaging machine and transported further on placed standing on the bottom end.

Transportation of the packages may be along part of a circle having a radius equal to the radius of curvature of the rotation of the drivers. This makes it possible to use mechanically simple means for transporting the packages.

In one embodiment, the radius of curvature of the rotation of the drivers is essentially equal to a radius of curvature of a path of movement of packages leaving the packaging machine. In this way, it is possible to transport the packages from the infeed station maintaining the relative position of the packages leaving the packaging machine.

The drivers may be arranged to transport one package at a time from the infeed station to the outfeed station. This is convenient for instance in the case of a packaging machine which otherwise delivers two or more packages at the time, but which at starting and stopping delivers only one package at a time for a short period of time.

The drivers are preferably arranged to transport two or more packages at a time from the infeed station to the outfeed station. Thus, the device may serve a packaging machine delivering two or more packages at a time.

In a preferred embodiment, the drivers are arranged to push together the packages leaving the packaging machine at a distance from each other, by means of rotating the drivers engaging the packages at the infeed station relatively towards each other before transporting the packages to the outfeed station. In this manner, it may be assured that the packages do not climb on each other and fall over.

The inventive method of feeding packages from a packaging machine comprises the steps of:

receiving at an infeed station adjacent to the packaging machine a first set of at least one package between a first and a second package driver, the first driver being arranged in a pair with a third driver and the second driver being arranged in a pair with a fourth driver, the first and third drivers and the second and fourth drivers respectively being arranged diametrically in relation to each other around a common centre axis, said drivers being rotatable about the centre axis, transporting said at least one package by means of rotation of the drivers in a transportation direction about the centre axis to an outfeed station, the first driver moving behind and the second driver moving in front of said at least one package, and when said at least one package has reached the outfeed station, returning the first driver to the infeed station and advancing the second driver by rotation about the centre axis so that the fourth driver advances to the infeed station, the first and fourth drivers being ready to receive a second set of at least one package. This method makes it possible to quickly and securely feed packages from the packaging machine.

The packages may be transferred to a conveyor belt at the outfeed station, the conveyor belt moving at a conveyor belt speed. The packages are preferably transported from the infeed station to the outfeed station at a speed essentially equal to the conveyor belt speed. Thus, the packages have the relevant speed when delivered to the conveyor belt, and therefore the risk of the packages falling over is minimized.

In one variant of the method of the invention, the packages are picked upside down from the packaging machine and turned and placed the right way round at the infeed station. This makes it possible to transport packages standing on their bottom end, even though they have been filled through the bottom end and therefore leave the packaging machine upside down.

One package at a time may be fed from the packaging machine. This may be the case at start-up and close-down of a production run in a packaging machine otherwise delivering two or more packages at a time.

In a preferred variant of the method, two or more packages at a time are fed from the packaging machine. This provides an effective way of feeding packages.

The packages may be received at the infeed station at a distance from each other, pushed together by means of rotating the drivers receiving the packages relatively towards each other, and transported to the outfeed station in abutment with each other. This reduces the risk of packages falling over.

BRIEF DESCRIPTION OF THE DRAWINGS

The invention will be described in closer detail with reference to the appended schematic drawings, which show an example of a currently preferred embodiment of the invention.

FIG. 1 is a perspective view of the inventive device in a first position.

FIG. 2 shows the device of FIG. 1 in a second position.

FIG. 3 shows the device of FIG. 1 in a third position.

FIG. 4 shows the device of FIG. 1 in a fourth position.

FIG. 5 shows the device of FIG. 1 in a fifth position.

DETAILED DESCRIPTION OF PREFERRED EMBODIMENTS

Figure 6:
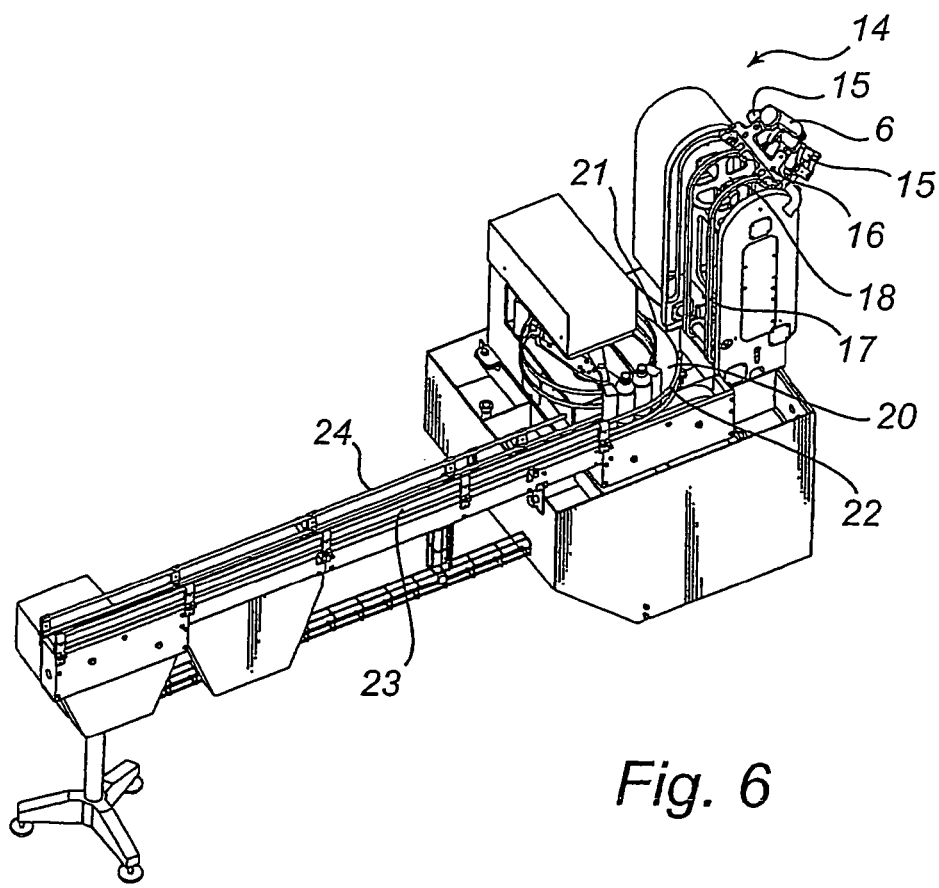
FIG. 6 is a perspective view of the feeding device including a device for moving and turning packages shown in a first position.

With reference to FIG. 1, the feeding device 1 has a first package driver 2, a second package driver 3, a third package driver 4 and a fourth package driver 5 for transporting packages 6 from an infeed station 7 to an outfeed station 8. The first driver 2 is arranged in a pair with the third driver 4. Analogously, the second driver 3 is arranged in a pair with the fourth driver 5. The drivers in each pair are arranged diametrically in relation to each other about a common centre axis C coincident with a shaft 9. The drivers 2-5 are rotatable about the centre axis C.

Each driver pair is driven via the shaft 9 by a respective servo motor (not shown). The pair comprising the first and third drivers 2, 4 is driven by a servo motor placed above the driver pairs. Correspondingly, the pair comprising the second and fourth drivers 3, 5 is driven by a servo motor placed below the driver pairs.

The drivers consist of wings or paddles 2-5 arranged on arms 12, 13. The paddles 2-5 are preferably of a convex shape, the shape more or less corresponding to the circumference of the packages 6 to be transported.

FIG. 6 shows a turner device 14 for picking packages 6 from the packaging machine (not shown). The turner 14 has two grippers 15 for gripping packages 6 leaving the packaging machine. The grippers 15 are arranged on a carriage 16 which travels on two vertical guides 17 (the second vertical guide is hidden, but parallel with the vertical guide 17) and an arched guide 18 connecting the vertical guides 17.

Figure 7:
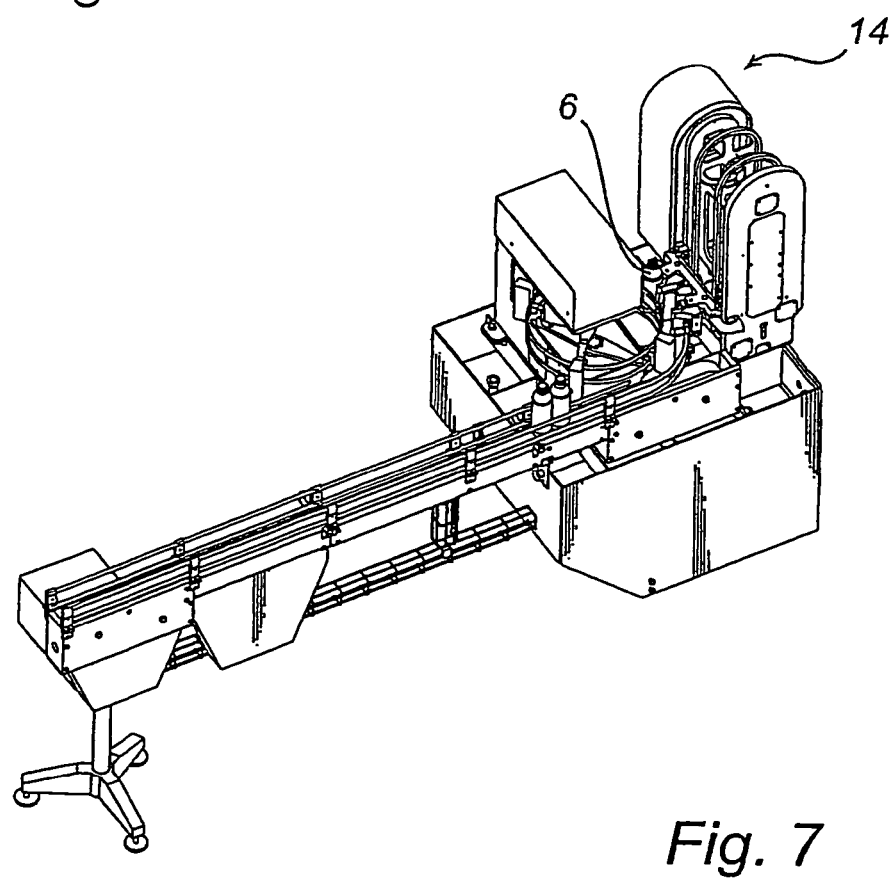
FIG. 7 shows the device of FIG. 6 with the moving and turning device in a second position.

In FIG. 6, a position of the turner 14 is shown where a package 6 has just been picked from the packaging machine. The package is held upside down. As the grippers 15 on their carriage 16 pass over the arched guides 18, the package 6 is turned the right way round, as can be seen from FIG. 7.

A quarter-circular path 20 corresponding to the path of movement of the drivers 2-5 is arranged around the shaft 9. At the infeed station 7, the path 20 has a low bent-up flange 21 for preventing packages 6 from falling off the path 20. For the same reason, there is a railing 22 along the radially outer edge of the path from the infeed station 7 and onwards in the transportation direction. At the outfeed station 8, a conveyor belt 23 connects with the path 20. A railing 24 extends along the inner edge of the conveyor belt 23.

The method by which the device described above feeds packages from a packaging machine will now be described. It comprises the steps of:

receiving at an infeed station 7 adjacent to the packaging machine a first set of at least one package 6 between the first and second package drivers 2, 3 (see FIG. 1), transporting said at least one package 6 by means of rotation of the drivers 2, 3 in the transportation direction T about the centre axis C to the outfeed station 8 (see FIG. 3), the first driver 2 moving behind and the second driver 3 moving in front of said at least one package 6, and when said at least one package 6 has reached the outfeed station 8, returning the first driver 2 to the infeed station 7 in a return direction R and advancing the second driver 3 by rotation about the centre axis C (see FIG. 4) so that the fourth driver 5 advances to the infeed station 7, the first and fourth drivers 2, 5 being ready to receive a second set of at least one package 6 (see FIG. 5).

The second set of at least one package 6 is fed from the packaging machine by means of the steps of:

receiving at the infeed station 7 said second set of at least one package 6 between the fourth and first drivers 5, 2, transporting said second set of at least one package 6 by means of rotation of the drivers 5, 2 in the transportation direction T about the centre axis C to the outfeed station 8, the fourth driver 5 moving behind and the first driver 2 moving in front of said second set of at least one package 6, and when said second set of at least one package 6 has reached the outfeed station 8, returning the fourth driver 5 to the infeed station 7 and advancing the first driver 2 by rotation about the centre axis C so that the third driver 4 advances to the infeed station 7, the fourth 5 and third 4 drivers being ready to receive a subsequent set of at least one package 6.

The third set of at least one package 6 is fed from the packaging machine by means of the steps of:

receiving at the infeed station 7 said third set of at least one package 6 between the third and fourth drivers 4, 5, transporting said third set of at least one package 6 by means of rotation of the drivers 4,5 in the transportation direction T about the centre axis C to the outfeed station 8, the third driver 4 moving behind and the fourth driver 5 moving in front of said third set of at least one package 6, and when said third set of at least one package 6 has reached the outfeed station 8, returning the third driver 4 to the infeed station 7 and advancing the fourth driver 5 by rotation about the centre axis C so that the second driver 3 advances to the infeed station 7, the third 4 and second drivers 3 being ready to receive a subsequent set of at least one package 6.

The fourth set of at least one package 6 is fed from the packaging machine by means of the steps of:

receiving at the infeed station 7 said fourth set of at least one package 6 between the second 3 and third 4 drivers, transporting said fourth set of at least one package 6 by means of rotation of the drivers 3,4 in the transportation direction T about the centre axis C to the outfeed station 8, the second driver 3 moving behind and the third driver 4 moving in front of said fourth set of at least one package 6, and when said fourth set of at least one package 6 has reached the outfeed station 8, returning the second driver 3 to the infeed station 7 and advancing the third driver 4 by rotation about the centre axis C so that the first driver 2 advances to the infeed station 7, the first 2 and second 3 drivers being ready to receive a subsequent set of at least one package 6.

After these four sets of packages 6, the drivers 2-5 have thus returned to their original positions and feeding of packages 6 from the packaging machine may continue in this alternating manner. During every second transportation, a driver in the pair comprising the first and third drivers 2, 4 moves behind the packages 6. During the other transportations it is one of the drivers in the pair comprising the second and fourth drivers 3, 5 that moves behind the packages 6. In the same way, when the first or third driver 2, 4 moves behind the packages 6, the second or fourth driver 3, 5 moves in front of the packages 6 and vice versa.

Every time the drivers 2-5 have delivered packages 6 at the outfeed station 8, the driver that has moved behind the packages 6 reverses its rotational movement and returns to the infeed station 7. This driver will be moving in front of the packages 6 during the next transportation. The driver that moved in front of the packages 6 continues its rotational movement until the other driver in the same pair has reached the infeed station 7. During the next transportation, this other driver will thus be moving behind the packages 6.

In every transportation, the packages are moved along a circular arc, through approximately 90° of the circle described by the drivers during their rotational movement. The circular arc along which the packages 6 move has a radius which is equal to the radius of curvature of the rotational movement of the drivers.

The packaging machine normally delivers two packages 6 at a time and thus, normally two packages 6 at a time are received at the infeed station. However, if the packaging machine detects that a package is defective, it will discard that package and only one package will be received at the infeed station 7. The turner 14 may be used for discarding defective packages and it may in such case throw the defective package in the direction of the tangent of the movement at the peak of the turning movement into a hopper (not shown) provided for reception of defective packages.

When the packaging machine has just been started and just before it stops, it delivers only one package 6 at a time, and accordingly, only one package 6 at a time will be received at the infeed station 7.

The two packages 6 at a time delivered by the packaging machine will leave the packaging machine at a distance from each other and will be placed by the turner 14 at the same distance from each other at the infeed station 7 of the feeding device 1. It is, however, desirable to transport the packages 6 in abutment with each other, since this will reduce the risk of the packages 6 "climbing" on each other and falling over. Therefore, before starting the transport of the packages 6 to the outfeed station 8, the drivers at the infeed station 7 will first pack the packages 6 together by rotating relatively towards each other (see FIG. 2), thus reducing the distance between the drivers engaging the packages 6 received. This relative rotation of the drivers towards each other may be performed in a number of ways. Firstly, the drivers at the infeed station 7 may actually both be rotated towards each other. Secondly, the driver engaging the packages 6 from behind may stand still and the driver engaging the packages from the front may rotate towards the stationary driver. Thirdly, the driver engaging the packages 6 from the front may stand still and the driver engaging the packages 6 from behind rotate towards the stationary driver. Once the packages 6 are packed together, both drivers engaging the packages at the infeed station 7 will start to rotate in the transportation direction to transport the packages 6 to the outfeed station 8. The packing together of the packages may, of course, also be done at the beginning of the transportation and not necessarily before transportation commences.

At the outfeed station 8, the packages 6 are delivered to the conveyor belt 23, which transports the packages 6 away for further treatment, e.g. for placing the packages 6 in crates for shipping. The drivers 2-5 transport the packages 6 to the outfeed station at a speed which is equal to a speed at which the conveyor belt 23 moves. Therefore, the conveyor belt 23 will not have to accelerate or decelerate the packages, and thus the risk of packages 6 falling over is reduced.

The skilled person will realise that a number of modifications of the embodiments described herein are possible without departing from the scope of the invention as defined in the appended claims.

For instance, the feeding device may be adapted to feed more than two packages at a time from the packaging machine. In such case, the turner 14 may be fitted with a corresponding number of grippers 15.

The feeding device may also receive packages 6 leaving the packaging machine already standing the right way round. Thus, the turner 14 would not be necessary and e.g. a robotic arm could be used instead for picking packages 6 from the packaging machine and placing them at the infeed station 7.

The paddles 2-5 may be releasably attached to the arms 12 13, allowing a change of paddles so that paddles with a convex shape corresponding to another size and shape of packages may be fitted.

The invention claimed is:

1. A device for feeding packages from a packaging machine, comprising a first, a second, a third and a fourth package driver for transporting packages in a transportation direction from an infeed station of the device arranged to receive packages from said packaging machine to an outfeed station of the device, said drivers being arranged in pairs, so that the first and third drivers and the second and fourth drivers, respectively, are arranged diametrically and fixed in relation to each other about a common centre axis, said pairs of drivers being rotatable about the centre axis independently from each other.

2. A device as claimed in claim 1, wherein one driver in one pair is arranged to engage the packages from behind in the transportation direction and one driver in the other pair is arranged to engage the packages from the front in the transportation direction.

3. A device as claimed in claim 2, wherein the drivers are arranged to rotate alternately in a first and second direction about the centre axis, the transportation direction being in the first direction.

4. A device as claimed in claim 3, wherein the pair comprising the first and third drivers and the pair comprising the second and fourth drivers, respectively, after each transportation of packages to the outfeed station are arranged to rotate in opposite directions.

5. A device as claimed in claim 3, wherein the first and third drivers are arranged to rotate in the first direction after every second transportation of packages to the outfeed station and to rotate in the second direction after every second transportation of packages to the outfeed station.

6. A device as claimed in claim 3, wherein the driver which engages the packages from behind, after transportation of the packages to the outfeed station is arranged to rotate in the second direction to enable engagement with subsequent packages at the infeed station from the front, and wherein the driver which engages the packages from the front, after transportation of the packages to the outfeed station is arranged to rotate in the first direction to enable engagement of the other driver in the same pair with the subsequent packages at the infeed station from behind.

7. A device as claimed in claim 1, wherein the drivers are arranged to transfer the packages to a conveyor belt at the outfeed station the conveyor belt moving at a conveyor belt speed, the drivers being arranged to deliver the packages at a speed essentially equal to the conveyor belt speed.

8. A device as claimed in claim 1, further comprising turning means for moving and turning packages leaving the packaging machine upside down, placing the packages turned the right way round at the infeed station of the device.

9. A device as claimed in claim 1, wherein the transportation of the packages occurs along part of a circle having a radius essentially equal to the radius of curvature of the rotation of the drivers.

10. A device as claimed in claim 9, wherein the radius of curvature of the rotation of the drivers is essentially equal to a radius of curvature of a path of movement of packages leaving the packaging machine.

11. A device as claimed in claim 1, wherein the drivers are arranged to transport one package at a time from the infeed station to the outfeed station.

12. A device as claimed in claim 1, wherein the drivers are arranged to transport two or more packages at a time from the infeed station to the outfeed station.

13. A device as claimed in claim 12, wherein the drivers are arranged to push together said two or more packages leaving the packaging machine with a distance between them, by rotating the drivers engaging the packages at the infeed station relatively towards each other before transporting the packages to the outfeed station.

14. A method of feeding packages from a packaging machine, comprising:
   receiving at an infeed station adjacent to the packaging machine a first set of at least one package between a first and a second package driver, the first driver being arranged in a pair with a third driver and the second driver being arranged in a pair with a fourth driver, the first and third drivers and the second and fourth drivers respectively being arranged diametrically in relation to each other around a common centre axis, said drivers being rotatable about the centre axis,
   transporting said at least one package by rotation of the drivers in a transportation direction about the centre axis to an outfeed station, the first driver moving behind and the second driver moving in front of said at least one package, and
   when said at least one package has reached the outfeed station, returning the first driver to the infeed station and advancing the second driver by rotation about the centre axis so that the fourth driver advances to the infeed station, the first and fourth drivers being ready to receive a second set of at least one package.

15. A method as claimed in claim 14, wherein the packages are transferred to a conveyor belt at the outfeed station, the conveyor belt moving at a conveyor belt speed, the packages being transported from the infeed station to the outfeed station at a speed essentially equal to the conveyor belt speed.

16. A method as claimed in claim 14, wherein the packages are picked upside down from the packaging machine and turned and placed the right way round at the infeed station.

17. A method as claimed in claim 14, wherein one package at a time is fed from the packaging machine.

18. A method as claimed in claim 14, wherein two or more packages at a time are fed from the packaging machine.

19. A method as claimed in claim 18, wherein said two or more packages are received at the infeed station at a distance from each other,
   pushed together by means of rotating the drivers receiving the packages relatively towards each other, and
   transported to the outfeed station in abutment with each other.

* * * * *